United States Patent
Linz

(10) Patent No.: US 6,219,377 B1
(45) Date of Patent: Apr. 17, 2001

(54) METHOD AND APPARATUS FOR GENERATING TONES IN A MULTI-TONE MODEM

(75) Inventor: Alfredo R. Linz, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/106,993

(22) Filed: Jun. 29, 1998

(51) Int. Cl.$^7$ ................. H04B 1/38; H04L 5/00
(52) U.S. Cl. ............. 375/222; 375/262; 375/265; 375/341; 714/795; 704/242
(58) Field of Search .................. 375/222, 262, 375/265, 341; 714/795; 704/242

(56) References Cited

U.S. PATENT DOCUMENTS

| | | | |
|---|---|---|---|
| 5,317,596 | * 5/1994 | Ho et al. | 375/232 |
| 5,402,473 | 3/1995 | Takai et al. | 379/93 |
| 5,495,483 | 2/1996 | Grube et al. | 370/95.1 |
| 5,825,826 | * 10/1998 | May et al. | 375/295 |
| 5,838,268 | * 11/1998 | Frenkel | 341/111 |
| 5,901,180 | * 5/1999 | Aslanis et al. | 375/261 |
| 5,909,463 | * 6/1999 | Johnson et al. | 375/220 |
| 6,026,097 | 2/2000 | Voois et al. | 370/468 |
| 6,073,179 | * 6/2000 | Liu et al. | 709/229 |
| 6,088,385 | * 7/2000 | Liu | 375/219 |

FOREIGN PATENT DOCUMENTS

0806852A2   4/1990   (EP) .

OTHER PUBLICATIONS

Bingham, J., *Standards Project for Interfaces Relating to Carrier to Customer Connection of Asymmetrical Digital Subscriber Line (ADSL) Equipment*, dated Jun. 1, 1998.
International Search Report issued on PCT Application Serial No. 98/26,958 issued on Dec. 18, 1998.
K. Maxwell, *Asymmetric Digital Subscriber Line: Interim Technology for the Next Forty Years*, IEEE Communications Magazine, vol. 34, No. 10, Oct. 1, 1996, pp. 100–106, XP000614169.

* cited by examiner

Primary Examiner—Stephen Chin
Assistant Examiner—Paul N Rupert
(74) Attorney, Agent, or Firm—Williams, Morgan & Amerson

(57) ABSTRACT

A method and modem is provided for communicating data using a plurality of tones. The modem includes an IFFT unit capable of providing a signal comprising a plurality of tones, an interpolator capable of interpolating the signal to produce an interpolated signal, and a tone adder capable of adding a tone having a first preselected frequency and the interpolated signal to produce an output signal.

22 Claims, 4 Drawing Sheets

METHOD AND APPARATUS FOR GENERATING TONES IN A MULTI-TONE MODEM

BACKGROUND OF THE INVENTION

1. Field of the Invention

This invention relates generally to modem communications, and, more particularly, generating tones in a multi-tone modem.

2. Description of the Related Art

As the complexity of online content grows, many users find that typical connections, such as a 28.8 KBPS modem, are simply not fast enough. Even newer modems that allow communication speeds of 56.6 KBPS seem slow in some applications. A common bottleneck in online applications, such as the Internet, is telecommunications bandwidth. Projected demand for additional services, such as video-on-demand, teleconferencing, interactive television, and the like is likely to exacerbate the bandwidth problem.

One telecommunications protocol designed to alleviate the bandwidth problem is described in the asynchronous digital subscriber line (ADSL) standard, ANSI T1.413 Issue 2, entitled, "Interface Between Networks and Customer Installation—Asymmetric Digital Subscriber Line (ADSL) Metallic Interface, Rev. R6, dated Sep. 26 1997, incorporated herein by reference in its entirety.

ADSL modems use two competing modulation schemes: discrete multitone (DMT) and carrierless amplitude/phase modulation (CAP). DMT is the standard adopted by the American National Standards Institute.

The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 KHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

The DMT ADSL modem described above is hereinafter referred to as "full-rate" modem because it utilizes all 256 tones (sometimes referred to as "sub-channels") as defined by the (ANSI) ADSL standard. The standardized DMT system uses the 256 tones in the forward (downstream) direction, where the downstream direction is typically construed as transmissions from a central office (typically owned by the telephone company) to an end-user. FIG. 1 illustrates the bandwidth requirements for a "full-rate" ADSL modem. To support the frequency bandwidth shown in FIG. 1, the "full-rate" ADSL modem must have an analog sampling rate of at least 2.2E+6 samples per second.

The DMT ADSL modem generally utilizes a 512-point Inverse Fast Fourier Transform (IFFT) for modulation and a 512-point Fast Fourier Transform (FFT) for demodulation. When transmitting a signal, the DMT ADSL modem uses a 512-point IFFT to generate an output signal from 256 complex data values. Those skilled in the art will appreciate that any two symmetrically located FFT bins form a Quadrature Amplitude Modulation (QAM) channel. The QAM channel can be modulated by a complex symbol, which means that it is possible to modulate the amplitude and phase of the QAM channel. All QAM channels except the N/2-th (e.g., $512 \div 2 = 256^{th}$) channel can be modulated by a complex symbol, where N is the number of bins or channels of an IFFT unit. The N/2-th channel, which is typically not used by DMT ADSL modems, has a quadrature carrier identical to zero, and thus can be modulated only by a real symbol.

The DMT standard for a full-rate modem requires the generation of several necessary tones for communication. For example, the DMT standard requires generation of a 276 KHz pilot tone as well as a 310.5 KHz tone. The 276 KHz pilot tone is utilized for synchronization between two communicating modems. Because the specific frequency for a given tone is 4.3125 KHz times the tone number, the pilot tone (i.e., 276 KHz) corresponds to the $64^{th}$ tone and the 310.5 KHz tone corresponds to the $72^{nd}$ tone. The pilot tone is a complex tone, having a magnitude and a phase. The phase of the pilot tone, which is specified as 45 degrees, for example, can be utilized by a receiving DMT ADSL modem to synchronize an incoming signal.

The above described full-rate DMT ADSL modem has a high bandwidth for transmitting data, but is inflexible. All potential installations might not require the same bandwidth. In addition, due to the algorithm processing requirements, storage requirements, power consumption, gate count, analog sample converter rate, and physical size required to support the bandwidth shown in FIG. 1, the modem is costly, which may preclude its use for certain applications. Accordingly, DMT ADSL modems that support smaller bandwidth than full-rate modems are emerging in the market.

A quarter-rate DMT ADSL modem, for example, has a lower bandwidth than the full-rate modem but still uses the DMT scheme to communicate with other modems. A quarter-rate modem has a bandwidth of 276 KHz (1.104 MHz÷4), and it operates at a sampling rate of 552KHz.

While utilizing lower bandwidth DMT modems has several advantages, there is, however, at least one shortcoming. Lower bandwidth DMT modems sometimes may not be compatible with full-rate DMT modems because of their inability to generate certain tones required by the DMT standard. That is, the lower bandwidth modems may not be capable of generating several necessary tones, such as the 276 KHz pilot tone and the 310.5 KHz tone, which are required by the DMT standard for a full-rate modem.

The 276 KHz and 310.5 KHz tones may not be readily generated in certain lower bandwidth DMT modems for a variety of reasons. For example, in a quarter-rate modem, the FFT has 128 bins (e.g., N=128), which means that channel 64 corresponds to the N/2-th channel. The $64^{th}$ channel corresponds to the 276 KHz pilot tone that is required by a full-rate DMT modem and is typically modulated with a known amplitude and phase. However, because the 64$^{th}$ channel is the N/2 channel in a quarter-rate modem, it has a quadrature carrier that is equal to zero and cannot be modulated by a complex symbol (e.g., no imaginary component), as is required by the DMT standard for full modems. The 310.5 KHz tone, which corresponds to the 72$^{nd}$ channel, is simply not available in a quarter-rate modem that has a bandwidth of only 276 KHz (i.e., only 64 channels).

The present invention is directed to overcoming, or at least reducing the effects of, one or more of the problems set forth above.

SUMMARY OF THE INVENTION

In one aspect of the present invention, a method is provided for communicating with a modem. The method includes providing a signal from an IFFT unit of the modem, interpolating the signal to provide an interpolated signal, providing a tone, and adding the tone to the interpolated signal.

In one aspect of the present invention, a modem is provided for communicating data using a plurality of tones. The modem includes an IFFT unit that is capable of providing a signal comprising a plurality of tones. The modem also includes an interpolator capable of interpolating the signal to produce an interpolated signal, and a tone adder capable of adding a tone having a first preselected frequency and the interpolated signal to produce an output signal.

BRIEF DESCRIPTION OF THE DRAWINGS

Other objects and advantages of the invention will become apparent upon reading the following detailed description and upon reference to the drawings in which.

Figure 1:
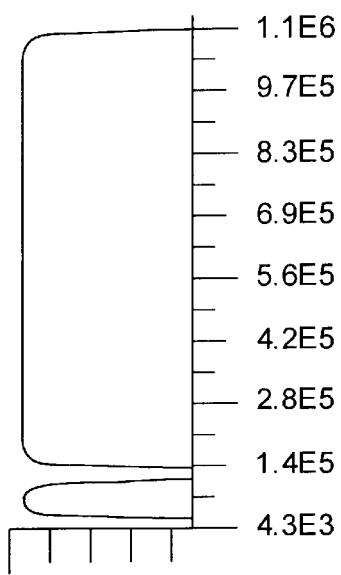
FIG. 1 illustrates a graph of the bandwidth spectrum for a prior art full-rate ADSL modem.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
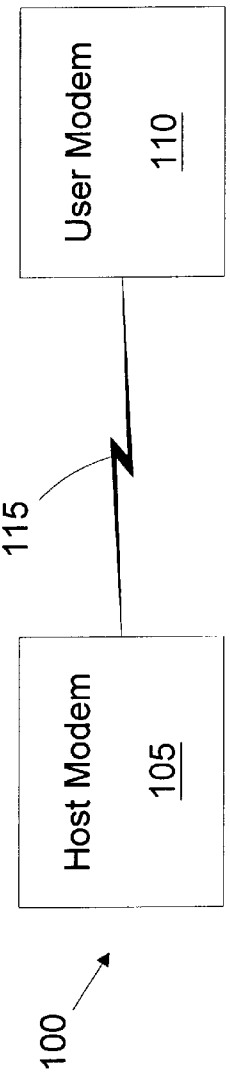
FIG. 2 depicts a block diagram of a communications system of the present invention.

Referring to FIG. 2, a block diagram of a communications system 100 is provided. The communications system 100 includes a host modem 105 coupled to a user modem 110 by a connection 115. In the illustrated embodiment, the connection 115 is an ordinary twisted pair connection, as is common in present day telephone networks. However, other connection types are contemplated, depending on the specific implementation.

The host and user modems 105, 110 in FIG. 2 are DMT ADSL modems. The host modem 105 in accordance with the present invention can have a smaller bandwidth than the user modem 110, and is capable of communicating with the user modem 110. In accordance with the present invention, the host modem 105 is capable of generating tones necessary for compatibility with the user modem 110. The host modem 105, which may be located in a central switching office, is capable of transmitting voice and data signals (hereinafter referred to as "data") downstream to the user modem 110. The user modem 110 may, for example, reside at a customer's residence.

Figure 3:
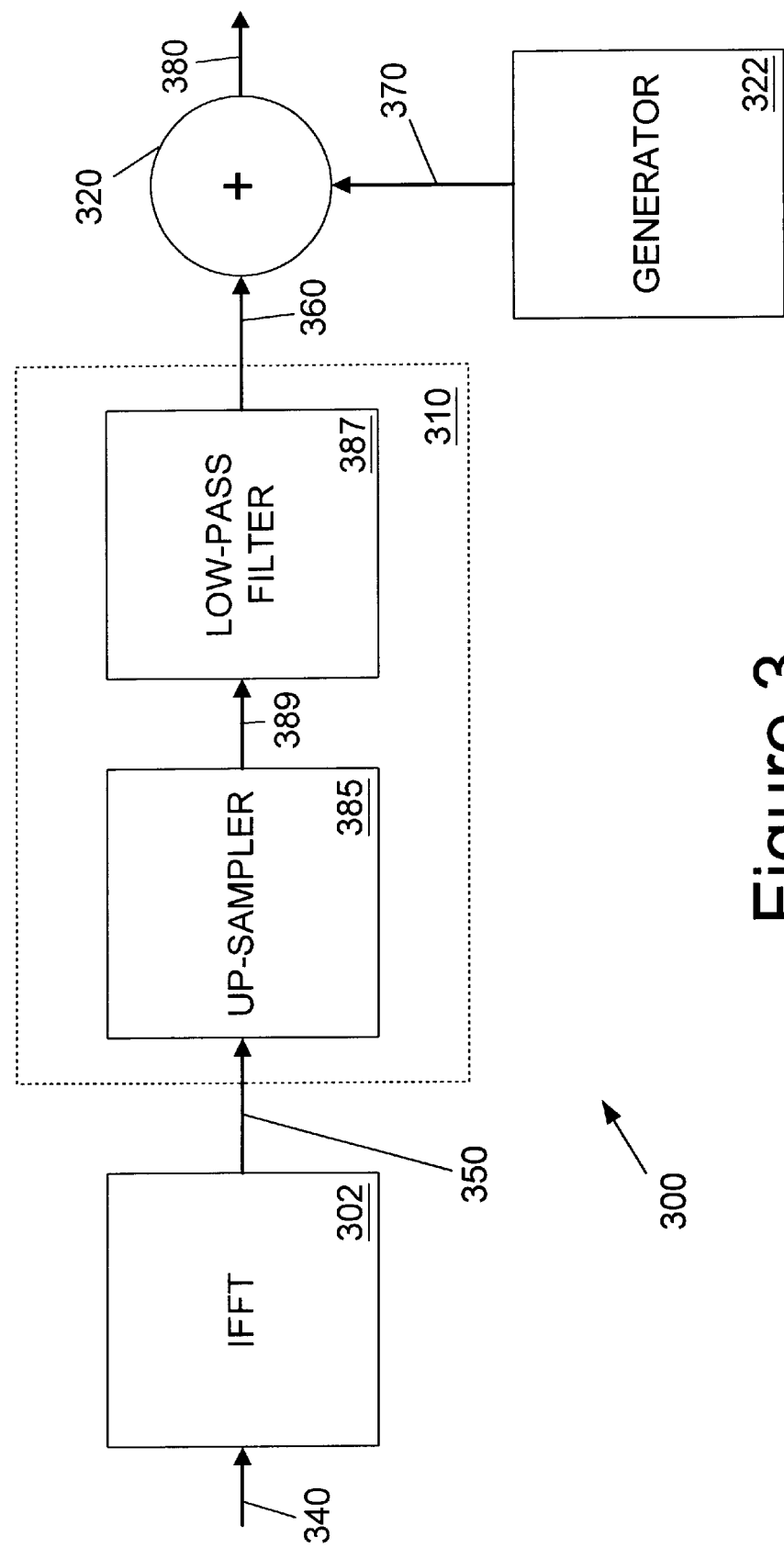
FIG. 3 illustrates a block diagram of a quarter-rate modem in accordance with the present invention.

FIG. 3 illustrates one embodiment of the host modem 105 in accordance with the present invention that can be utilized to communicate downstream with the user modem 110. The host modem 105 in the illustrated embodiment of FIG. 3 is a quarter-rate DMT ADSL modem 300 and the user modem 110 is a full-rate DMT ADSL modem (not shown). The quarter-rate modem 300, in accordance with one embodiment of the present invention, is capable of using the same ADSL protocols and algorithms as the user modem (e.g., a full-band modem) 110, with the exception of the number of tones. For example, the quarter-rate modem 300 may use the same rate adaptive features as the user modem 110. Also the quarter-rate modem 300 may operate in a single latency mode (i.e., all data allocated to either the fast path or the interleaved path) or a dual latency path (i.e., data allocated to both paths).

The quarter-rate modem 300 utilizes 64 tones or channels to transmit data and has a data bandwidth of 276 KHz. The user modem 110, which is a full-rate modem, can receive up to 256 tones or channels and has a bandwidth of 2.208 MHz for receiving data. To be compatible with the user modem 110, the quarter-rate modem 300 must generally generate any necessary tones required by the user modem 110, such as the 276 KHz pilot tone. Additionally, other tones, such as a 310.5 KHz tone, may also be required.

The quarter-rate modem 300 of FIG. 3 includes an IFFT unit 302, an interpolator 310, a tone adder 320, and a tone generator 322. For clarity and ease of illustration, not all functional blocks of the quarter-rate modem 300 are illustrated, because these items are known to one of ordinary skill in the art. Therefore, functional blocks for a cyclic prefix adder (not shown) or the like are not illustrated in FIG. 3.

FIG. 3 includes a data signal on a line 340 that is provided to an input terminal/port of the IFFT unit 302. The data signal on the line 340 comprises frequency domain multicarrier symbols. The IFFT unit 302 transforms each frequency domain multicarrier symbol on the line 340 into a time domain multicarrier symbol. At the input terminal of the IFFT unit 302, one specific tone is reserved as a pilot tone that has a preselected amplitude and phase. As described above, the pilot tone, which is the tone at 276 KHz and corresponds to the $64^{th}$ tone, is utilized for synchronization between the quarter-rate modem 300 and the user modem 110 (see FIG. 2). But because the $64^{th}$ tone or channel is the N/2th channel in the quarter-rate modem 300, it cannot be modulated by the IFFT unit 302 with a complex symbol, as required by the ANSI standard for a full-rate modem 110.

Figure 4:
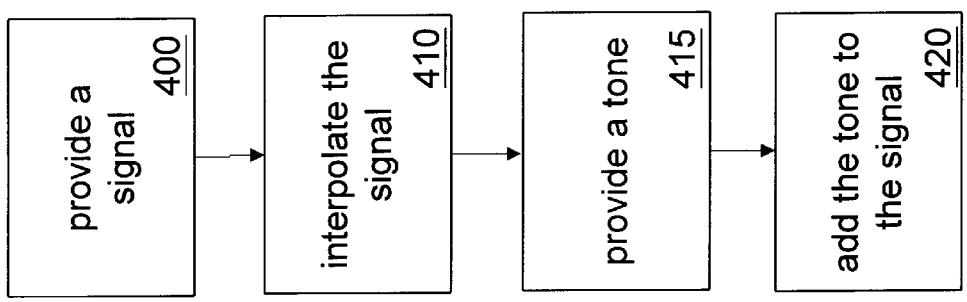
FIG. 4 depicts a flowchart of a method in accordance with the present invention that can be utilized by the quarter-rate modem of FIG. 3.

The quarter-rate modem 300 employs a method, such as that illustrated in FIG. 4, to generate the tones required for compatibility with the user modem 110. The method of FIG. 4 begins at block 400, where the IFFT unit 302 provides a signal to the interpolator 310 on a line 350. The interpolator 310, at block 410, interpolates the signal on the line 350 and provides it to the tone adder 320 on a line 360. At block 415, the tone generator 322 generates a tone or tones on a line 370 that can be added to the signal on the line 360. The tone adder 320, at block 420, adds the interpolated signal on the line 360 to the tone or tones generated on the line 370, and provides an output signal on a line 380. The output signal on the line 380 can be further processed by a digital-to-analog converter (not shown) before it is driven over the subscriber line 115 (see FIG. 2) to the user modem 110 (see FIG. 2).

The interpolator 310 includes an up-sampler 385 and a low-pass filter 387. Interpolation, as described herein, includes up-sampling the signal on the line 350 and then passing it through the low-pass filter 387. The signal on the line 350 of the host modem 105 is sampled at a frequency of at least 552 KHz. To prevent aliasing when tones such as the 276 KHz and/or 310.5 KHz tones are added to the signal on line 360, the up-sampler 385 increases the sampling rate of the signal on the line 350. Generally, the sampling rate must be at least twice the highest frequency of tone generated by the tone generator 322. In one embodiment, it is desirable to up-sample by a factor of 4 to make the output signal on the line 380 of the quarter-rate modem 300 similar to that of the user modem 110 (e.g. full-rate modem). Thus, by increasing the sampling rate by 4 (i.e. 4×552 KHz=2.208 MHz), it is possible to add any full-rate modem tones in the quarter-rate modem 300. Those skilled in the art will appreciate that the signal on the line 350 may be up-sampled with any desirable factor so long as the sampling rate is at least twice the highest frequency of the tone generated by the tone generator 322.

The tone adder 320, low-pass filter 387, and tone generator 322 are well known in the art, and any of a variety of devices known in the art can be utilized to perform the respective functions. The cut-off frequency of the low-pass filter 387 should be approximately equal to the highest data-carrying tone, which may be tone 63, or about 271.7 KHz. The low-pass filter 387 also serves an additional function of "smoothing" the up-sampled signal on the line 389.

A description provided below generally illustrates the functionality of the up-sampler 385, the low-pass filter 387, and the tone generator 322, as it applies in the quarter-rate modem 300. Assuming a symmetric IFFT unit 302, let the signal on the line 350 be:

$$x_m = \frac{1}{\sqrt{NF}} \sum_{k=0}^{N-1} d_k e^{jk2\frac{\pi}{N}}, \quad (1)$$

where $x_m$ is sample m of the output of the IFFT unit 302, with m=0, 1, . . . , N−1; where N equals 128 for the quarter-rate modem 300, and NF equals 512 for the full-rate modem 110; and where $d_k$ are complex data symbols on the line 340, satisfying $d_k=d^*_{N-k}$ for k=1, . . . , N−1 (e.g. satisfying the Hermitian symmetry condition, where * denotes the complex conjugate).

The up-sampled signal on the line 389, which in the illustrated embodiment is up-sampled by a factor of 4, is formed by inserting 3 zeros between each sample of x, and hence can be denoted as:

$$x4_m = \frac{1}{\sqrt{NF}} \sum_{k=0}^{N-1} d_k e^{j\frac{2\pi}{N}k\frac{m}{4}} \quad \text{if } m \text{ modulo } 4 = 0 \quad (2)$$
$$\text{(i.e., } m \text{ is a multiple of 4)}$$
$$= 0 \quad \text{otherwise.}$$

Recognizing that 4* N=NF=512, the signal on the line 389 can be rewritten as:

$$x4_m = \frac{1}{\sqrt{NF}} \sum_{k=0}^{N-1} d_k e^{j\frac{2\pi}{NF}km} \quad \text{if } m \text{ modulo } 4 = 0 \quad (3)$$
$$\text{(i.e., } m \text{ is a multiple of 4)}$$
$$= 0 \quad \text{otherwise.}$$

Because the signal on the line 389 was up-sampled by a factor of 4, it has the same sampling rate as the user modem 110 (i.e. same as a full-rate modem). The low-pass filter 387 processes the signal on the line 389 before it is provided to the tone adder 320.

The tone generator 322 generates the desired complex tones, such as the 276 KHz (i.e., tone 64) and 310.5 KHz (i.e., tone 72), which can then be added to the signal on the line 360. The generation of the 276 KHz pilot tone will be analyzed first. Assume that, for illustrative purposes, the pilot tone is represented by a complex symbol (1+j)/2. An IFFT unit (not shown) of a full-rate modem 110 would generate the pilot tone by adding the term (3) (see above) with its conjugate, where $d_k$= (1+j)/2 and k=64. Hence, the sum would yield:

$$t64_m = \frac{1}{\sqrt{NF}} \left[ \frac{(1+j)}{2} e^{j\frac{2\pi}{NF}64m} + \frac{(1-j)}{2} e^{j\frac{2\pi}{NF}(NF-64)m} \right], \quad (4)$$

which corresponds to the real time sequence $$t64_m = \sqrt{\frac{2}{NF}} \cos\left(\frac{\pi}{4}[m+1]\right) \quad (5)$$

having only 5 different values proportional to $$0, \pm 1, \pm \frac{\sqrt{2}}{2}.$$

To generate the 276 KHz pilot tone, the tone generator 322 needs only 2 distinct non-zero values. Those skilled in the art will appreciate that by storing a 1 and $$\frac{\sqrt{2}}{2}$$

in registers (not shown), the tone generator 322 can generate all of the above five values. That is, the tone generator 322 can generate the "0" by providing no tone, and the "−1" or can be generated by instructing the tone adder 322 subtract, rather than add, a "1" or $$“\frac{\sqrt{2}}{2}.”$$

The 310.5 KHz tone (i.e. tone 72) can be generated in a similar fashion as the pilot tone, where an IFFT unit (not shown) of a full-rate modem 110 would transform $$t72_m = \frac{1}{\sqrt{NF}}\left[(a+jb)e^{j\frac{2\pi}{NF}72m} + (a-jb)e^{j\frac{2\pi}{NF}(NF-72)m}\right] \quad (6)$$

to generate tone 72. The above term (6) can be reduced to a real value, irrespective of the values of a and b; however, the actual desired samples may depend on the values of a and b. Assuming, for illustrative purposes, that an initial phase of 0 is acceptable, it is possible to set a=0, b=0. Using these values, the real time sequence of the above term (6) is:

$$t72_m = \frac{1}{\sqrt{NF}}\cos\left(\frac{9\pi}{32}m\right), \quad (7)$$

which has 17 distinct values, including zero. Accordingly, the tone generator 322 needs only 8 non-zero values to generate 310.5 KHz tone.

Figure 5:
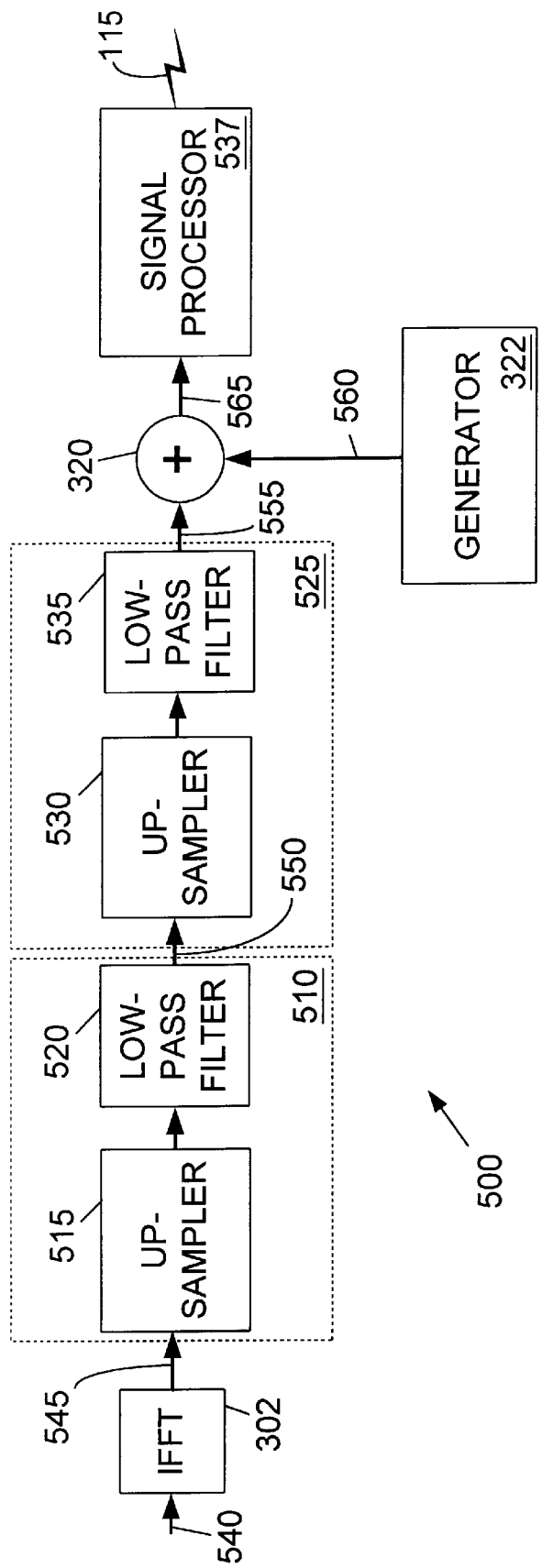
FIG. 5 illustrates a block diagram of an alternative embodiment of a quarter-rate modem that can be utilized to implement the method of FIG. 4.

FIG. 5 is an alternative embodiment of a quarter-rate modem 500 of the present invention that can employ the method of FIG. 4. The IFFT unit 302, the tone adder 320, and the tone generator 322 are identical to that of FIG. 3. FIG. 5 includes a first interpolator 510, comprising a first up-sampler 515 and a first low-pass filter 520, and a second interpolator 525, comprising a second up-sampler 530 and a second low-pass filter 535. FIG. 5 also includes a signal processor 537 that is described in more detail below.

As can be seen, a data signal on the line 540 is provided to the input terminal of the IFFT unit 302. The data signal on the line 540 comprises frequency domain multicarrier symbols. The IFFT unit 302 transforms each frequency domain multicarrier symbol on the line 540 into a time domain multicarrier symbol and provides it, at the block 400 (see FIG. 4), to an input of the first interpolator 510 on a line 545. At the block 410, the first interpolator 510 interpolates the signal by a factor of two and provides it to an input terminal of the second interpolator 525 on a line 550. The second interpolator 525 then interpolates the signal on the line 550 by a factor of two and provides it to the tone adder 320 on a line 555.

The tone generator 322 generates the required tone or tones and provides it, at the block 415, to the tone adder 320 on a line 560. The tone adder 320, at the block 420, adds the signal on the line 555 to the signal on the line 560 and provides it to the signal processor 537 on a line 565. The signal processor 537, as described herein, includes a digital-to-analog converter (not shown), a filter (not shown), and a line interface (not shown) that serves as an interface between the quarter-rate modem 500 and the connection 115 (see FIG. 2). The signal processor 537 processes the signal on the line 565 and transmits it over the connection 115 to the user modem 110 (see FIG. 2).

As can be seen, the quarter-rate modem 500 includes the first and second interpolator 510, 525, where each interpolates the input signal on the respective lines 545, 550 by a factor of two. Thus, in this embodiment, interpolation at the block 410 (see FIG. 4) is performed in two stages. Implementing the first and the second interpolator 510, 525 in series, as opposed to using a single interpolator 310 (see FIG. 3), can sometimes be more economical.

The quarter-rate modems 300, 500 in accordance with the present invention are capable of providing output signals that are compatible with the user modem 110. This means that the quarter-rate modems 300, 500 can generate requisite tones (such as tone 64, tone 72, or both) for interoperability with the user modem 110.

It should be noted that the present invention can be utilized to generate any desirable tone or tones in the host modem 105 (see FIG. 2). For illustrative purposes, the embodiments disclosed herein describe the addition of tone 64, tone 72, or both in quarter-rate modems 300, 500. It is envisioned that other tones can be similarly generated without deviating from the spirit and scope of the instant invention. Furthermore, it is contemplated that the method of FIG. 4 can be employed in generating tones in not only quarter-rate modems 300, 500, but in other modems having a bandwidth of a full-rate (or less) modem.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for communicating with a modem, comprising:
providing a signal from an IFFT (inverse fast fourier transform) unit of the modem;
interpolating the signal to provide an interpolated signal;
providing a tone; and
adding the tone to the interpolated signal.

2. The method of claim 1, wherein the act of providing a signal includes providing a time domain multicarrier symbol from the IFFT unit.

3. The method of claim 2, wherein the act of interpolating comprises:
up-sampling the signal to provide an up-sampled signal; and
passing the up-sampled signal through a first low-pass filter to provide the interpolated signal.

4. The method of claim 3, wherein up-sampling includes up-sampling by a factor of about four to provide the first up-sampled signal.

5. The method of claim 2, wherein the act of interpolating further comprises:
up-sampling the signal by a factor of about two to provide a first up-sampled signal;
passing the first up-sampled signal through a low-pass filter;
up-sampling the first up-sampled signal by a factor of about two to provide a second up-sampled signal; and
passing the second up-sampled signal through a low-pass filter.

6. The method of claim 2, wherein the act of providing a tone includes providing a pilot tone.

7. The method of claim 2, wherein the act of providing a tone includes providing a 310.5 KHz tone.

8. The method of claim 2, wherein the act of providing a tone includes providing a plurality of tones.

9. A modem for communicating data using a plurality of tones, comprising:
- an IFFT unit capable of providing a signal comprising a plurality of tones;
- an interpolator capable of interpolating the signal to produce an interpolated signal; and
- a tone adder capable of adding a tone having a first preselected frequency and the interpolated signal to produce an output signal.

10. The modem of claim 9, further including a tone generator for providing the tone.

11. The modem of claim 10, wherein the tone generator is capable of providing a plurality of tones.

12. The modem of claim 10, wherein the interpolator comprises:
- a first up-sampler having an input and an output terminal, the input terminal being coupled to the IFFT unit; and
- a first low-pass filter having an input and an output terminal, the input terminal of the first low-pass filter being coupled to the output terminal of the first up-sampler.

13. The modem of claim 12, wherein the first up-sampler is capable of up-sampling the signal by a factor of about four.

14. The modem of claim 12, wherein the first low-pass filter has a cut-off frequency corresponding to the frequency of the tone.

15. The modem of claim 12, wherein the interpolator further comprises:
- a second up-sampler having an input and an output terminal, the input terminal of the second up-sampler being coupled to the output terminal of the first low-pass filter; and
- a second low-pass filter having an input and an output terminal, the input terminal of the second low-pass filter being coupled to the output terminal of the second up-sampler.

16. The modem of claim 15, wherein the first up-sampler is capable of up-sampling the signal by a factor of about two.

17. The modem of claim 15, wherein the second up-sampler is capable of up-sampling the signal by a factor of about two.

18. A communications system, comprising:
- a user modem capable of transmitting data using a first bandwidth formed by a first plurality of upstream tones; and
- a host modem coupled to the user modem and being capable of transmitting data using a second bandwidth formed by a first plurality of downstream tones, the second bandwidth being smaller than the first bandwidth; wherein the host modem comprises:
  - an IFFT unit capable of providing a signal in time domain;
  - an interpolator capable of interpolating the signal to produce an interpolated signal; and
  - a tone adder capable of adding a tone and the interpolated signal to produce an output signal.

19. The communications system of claim 18, wherein the user modem is a full-rate modem.

20. The communications system of claim 18, wherein the host modem is a quarter-rate modem.

21. The communications system of claim 18, further including a tone generator for providing the tone.

22. The modem of claim 21, wherein the interpolator comprises:
- a first up-sampler having an input and an output terminal, the input terminal being coupled to the IFFT unit; and
- a first low-pass filter having an input and an output terminal, the input terminal of the first low-pass filter being coupled to the output terminal of the first up-sampler.

* * * * *